United States Patent
Maziers

(10) Patent No.: US 7,250,474 B2
(45) Date of Patent: Jul. 31, 2007

(54) PHYSICAL BLENDS OF POLYETHYLENES

(75) Inventor: Eric Maziers, Seneffe (BE)

(73) Assignee: TOTAL Petrochemicals Research Feluy, Feluy (BE)

( * ) Notice: Subject to any disclaimer, the term of this patent is extended or adjusted under 35 U.S.C. 154(b) by 306 days.

(21) Appl. No.: 10/493,142

(22) PCT Filed: Oct. 16, 2002

(86) PCT No.: PCT/EP02/11738

§ 371 (c)(1),
(2), (4) Date: Apr. 19, 2004

(87) PCT Pub. No.: WO03/033587

PCT Pub. Date: Apr. 24, 2003

(65) Prior Publication Data

US 2004/0249083 A1 Dec. 9, 2004

(30) Foreign Application Priority Data

Oct. 18, 2001 (EP) .................................. 01203932

(51) Int. Cl.
*C08L 23/04* (2006.01)
*C08F 10/02* (2006.01)

(52) U.S. Cl. ....................... 525/240; 525/245; 525/191; 526/110; 526/104; 526/352; 428/516; 428/517

(58) Field of Classification Search ................ 525/240, 525/245, 191; 526/110, 104, 352; 428/516, 428/517

See application file for complete search history.

(56) References Cited

U.S. PATENT DOCUMENTS

| 5,707,751 A | * | 1/1998 | Garza et al. ................ 428/515 |
| 6,010,792 A | * | 1/2000 | Lind et al. .................. 428/516 |
| 6,346,575 B1 | | 2/2002 | Debras et al. |
| 2002/0065368 A1 | | 5/2002 | Debras et al. |
| 2002/0099140 A1 | | 7/2002 | Debras et al. |

FOREIGN PATENT DOCUMENTS

WO          WO 9729152         8/1997

* cited by examiner

*Primary Examiner*—James J. Seidleck
*Assistant Examiner*—Olga Asinovsky
(74) *Attorney, Agent, or Firm*—William D. Jackson

(57) ABSTRACT

This invention discloses a process for the preparation of polyethylene resins having a narrow molecular weight distribution that comprises the steps of: (i) providing a first high molecular weight metallocene-produced linear low density polyethylene (mLLDPE) resin having a density of from 0.920 to 0.940 g/cm$^3$ and a MI2 of from 0.05 to 2 g/10 min; (ii) providing a second high density polyethylene (HDPE) prepared either with a Ziegler-Natta or with a metallocene catalyst, said polyethylene having a density ranging from 0.950 to 0.970 g/cm$^3$ and a MI2 of from 0.5 to 10 g/10 min; (iii) physically blending together the first and second polyethylenes to form a polyethylene resin having a narrow molecular weight distribution, a density ranging from 0.940 to 0.955 g/cm$^3$ and a MI2 of from 1 to 2 g/10 min.

18 Claims, 7 Drawing Sheets

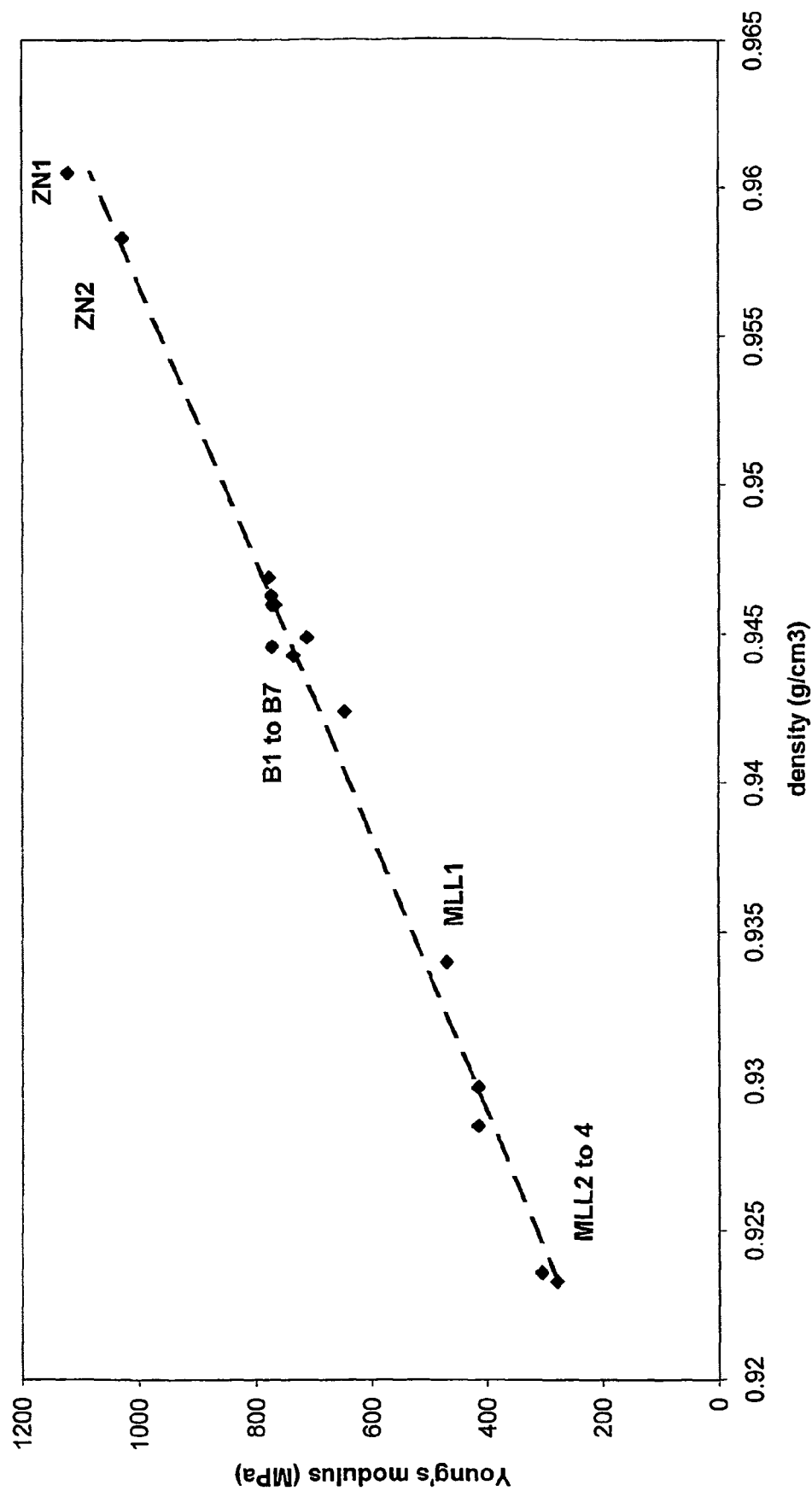

PHYSICAL BLENDS OF POLYETHYLENES

The present invention relates to the production and use of polyethylene resins produced by physical blends of polyethylenes. The final resins have improved gloss, environmental stress crack resistance and impact and can be used for applications in blow-molding, injection, rotomoulding, or injection blow moulding.

Polyolefins such as polyethylenes which have high molecular weight generally have improved mechanical properties over their lower molecular weight counterparts. However, high molecular weight polyolefins can be difficult to process and can be costly to produce. Polyolefins such as high density polyethylene (HDPE) having a narrow molecular weight distribution generally present a weakness in terms of environmental stress crack resistance (ESCR). For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processability of the resin decreases. It is possible to obtain an improved compromise between rigidity and ESCR as well good optical properties and easy processing by providing a polymer that is a blend of polyethylenes having molecular weights and densities far from those of the final product.

There are several methods for the production of blends of polyethylenes: melt blending, reactor in series configuration, or single reactor with dual site catalysts. Use of a dual site catalyst for the production of a bimodal resin in a single reactor is also known.

Chromium catalysts for use in polyolefin production tend to broaden the molecular weight distribution and can in some cases produce bimodal molecular weight distribution but usually the low molecular part of these resins contains a substantial amount of the comonomer. Whilst a broadened molecular weight distribution provides acceptable processing properties, a bimodal molecular weight distribution can provide excellent properties. In some cases it is even possible to regulate the amount of high and low molecular weight fraction and thereby regulate the mechanical properties.

Ziegler Natta catalysts are known to be capable of producing bimodal polyethylene using two reactors in series. Typically, in a first reactor, a low molecular weight homopolymer is formed by reaction between hydrogen and ethylene in the presence of the Ziegler Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene.

Metallocene catalysts are also known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl)zirconium dichloride and an ethylenebis(indenyl)zirconium dichloride. By using the two different metallocene catalysts in the same reactor, a molecular weight distribution is obtained which is at least bimodal.

EP-A-0600482 discloses the production of a resin composition of laminates which includes two polyethylene components, one of the components being prepared using a metallocene catalyst comprising ethylene-bis(4,5,6,7-tetrahydroindenyl)zirconium dichloride.

EP-A-0575123 discloses an ethylene polymer composition which may be produced using a metallocene catalyst.

EP-A-0735090 discloses a polyethylene resin composition which is produced by physical blending of three polyethylene components.

EP-A-0791627 discloses a polyethylene resin composition which is produced using a metallocene catalyst.

WO-A-95/26990 discloses a process for producing polymers of multi-modal molecular weight distributions using metallocene catalysts.

One of the major problems with many resins of the prior art is warping for injection-moulded parts. Warping may arise because of stress induced during the filling and packing stages of the process and non-uniform temperature distribution during the cooling stage. It is closely related to the problem of residual stress and thus to the intrinsic molecular structure of the resin. Other important problems of the prior art resins are low ESCR and poor gloss properties.

The present invention aims to overcome the disadvantages of the prior art and to produce easily and economically polyethylene resins with specific properties.

It is an object of the present invention to produce polyethylene resins with improved stress crack resistance.

It is another object of the present invention to produce polyethylene resins with improved optical properties.

It is a further object of the present invention to produce polyethylene resins presenting negligible warping when used in injection-moulded parts.

The present invention provides a process for the preparation of polyethylene resins having narrow molecular weight distribution that comprises essentially the steps of:
(i) providing a first metallocene-produced linear low density polyethylene (mLLDPE) resin having a density of from 0.920 to 0.940 g/cm$^3$ and a MI2 of from 0.05 to 2 g/10 min;
(ii) providing a second high density polyethylene (HDPE) prepared either with a Ziegler-Natta or with a metallocene catalyst, said polyethylene having a density ranging from 0.950 to 0.970 g/cm$^3$ and a MI2 of from 0.1 to 10 g/10 min;
(iii) physically blending together the first and second polyethylenes to form a polyethylene resin having a narrow molecular weight distribution, a density ranging from 0.930 to 0.955 g/cm$^3$ and a MI2 of from 0.5 to 8 g/10 min.

In this specification, the MI2 is measured by the procedures of ASTM D 1238 using a load of 2.16 kg at a temperature of 190° C. and the density is measured at 23° C. by the procedures of standard test ASTM D 1505.

Preferably, the polyethylene blend has a density ranging from 0.940 to 0.955 g/cm$^3$ and a MI2 of from 0.5 to 3 g/10 min.

It is another object of the present invention to provide plastic containers prepared with the blends of resins obtained from the process disclosed here-above.

The first polyethylene has a monomodal molecular weight distribution and is produced with a metallocene catalyst, the second polyethylene has monomodal molecular weight distribution and may be produced using a Ziegler-Natta catalyst or a metallocene catalyst.

The resulting polyethylene resin has a narrow molecular weight distribution and is produced by physically blending the first and second polyethylenes together.

In the embodiments of the invention, the low density fraction produced using the metallocene catalyst comprises at least 15 wt % of the resultant polyethylene resin, preferably it comprises from 20 to 80 wt % and more preferably from 30 to 50 wt %. The present invention is predicated on the discovery that the use of a metallocene catalyst component enables the production of a linear low density polyethylene fraction, said fraction having a very narrow molecular weight distribution. This yields both improved slow and rapid crack propagation properties as a result of a high and uniform level of comonomer distribution in the low density fraction. The density is preferably not more than 0.935 g/cm$^3$, compared to somewhat higher low density fractions achievable by Ziegler-Natta or chromium based catalysts, particularly when used in a slurry loop process. Thus the use of this metallocene catalyst enables precise control of the molecular weight distribution and density of the high crystallinity fraction of the resin, yielding improved mechanical properties and processability.

Typically, overall the narrow molecular weight distribution polyethylene resins of the present invention have a density of from 0.940 to 0.955 g/cm$^3$ with an MI2 of from 0.5 to 3 g/10 min.

The first and second polyethylenes are separately produced resins which are then physically blended to form the composite polyethylene resin having a narrow molecular weight distribution.

The components in the blends can be selected to produce a final resin with a narrow molecular weight distribution containing:

either fewer short chains and more long chains than the starting HDPE;

or fewer short chains and fewer long chains than the starting HDPE;

or more short chains and more long chains than the starting HDPE.

The resins produced according to the present invention all show significantly improved environmental stress crack resistance, impact strength, warping and gloss. These properties are important for many applications such as injected fuel tanks, injected bottle caps, blow-moulded milk bottles, blow-moulded and injection-blow-moulded packaging for cosmetic, pharmaceutical or food industry.

Preferably, the first polyethylene has a density of less than 0.935 g/cm$^3$. The density of the second polyethylene is higher and must be adjusted to produce the desired final density and the desired MI2, using the predictive empirical equations:

$$D_{blend} = \Sigma(\% \, n) \cdot D_n$$

for the density wherein $D_n$ represents the density of component n of the blend and (% n) its percentage in the blend.

$$MI2_{blend} = \Pi MI2_n^{(\% \, n)}$$

for the MI2, wherein $MI2_n$ represents the MI2 of component n of the blend and (% n) its percentage in the blend.

The physical blend comprises at least 15 wt % of the first metallocene-produced linear low density polyethylene and less than 85 wt % of the second non-metallocene high density polyethylene, preferably it comprises from 20 to 80 wt % of the mLLDPE and from 80 to 20 wt % of the HDPE, and most preferably from 30 to 50 wt % of the mLLDPE and from 70 to 50 wt % of the HDPE.

Embodiments of the present invention will now be described by way of examples. FIGS. 1 and 2 are gel permeation chromatographs of resins produced in accordance with the invention.

Metallocene Components

The metallocene catalyst component used in the present invention to prepare the mLLDPE or to prepare the HDPE can be any metallocene component known in the art of the general formula $R''_m Cp_2 MX_n$ where Cp is a substituted or unsubstituted cyclopentadienyl group; M is a transition metal from Group IVB of the Periodic Table or vanadium; X is a halogen or a hydrocarbyl group having from 1-10 carbon atoms; R" is a bridge, m is 0 or 1, and n is the valence of the metal M minus (2+m).

According to a preferred embodiment of the present invention, the metallocene catalyst can be a bis tetrahydroindenyl component in which each tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or CH3. More preferably, at least one and most preferably both cyclopentadienyl rings are unsubstituted.

In a particularly preferred embodiment, both indenyls are unsubstituted.

R" is preferably a methylene or ethylene bridge which is substituted or unsubstituted.

The metal M is preferably zirconium, hafnium or titanium, most preferably zirconium.

Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen.

Among the preferred catalysts used to prepare the mLLDPE, one can cite the bis tetrahydro-indenyl compounds and the bis(n-butyl-cyclopentadienyl) compounds, the bis tetrahydro-indenyl compounds being more preferred. The most preferred catalyst is ethylene bis(4,5,6,7-tetrahydro-1-indenyl)zirconium dichloride.

Among the preferred metallocene catalysts used to prepare the HDPE polyethylene resin one can cite the bis tetrahydro-indenyl compounds the bis indenyl compounds and the bis(n-butyl-cyclopentadienyl) compounds.

The metallocene catalyst component used in the present invention can be prepared by any known method. A preferred preparation method is described in J. Org. Chem. 288, 63-67 (1985).

The cocatalyst which activates the metallocene catalyst component can be any cocatalyst known for this purpose such as an aluminium-containing cocatalyst or a boron-containing cocatalyst. The aluminium-containing cocatalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

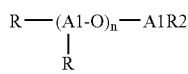

for oligomeric, linear alumoxanes and

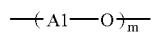

for oligomeric, cyclic alumoxane,
wherein n is 1-40, preferably 10-20, m is 3-40, preferably 3-20 and R is a $C_1$-$C_8$ alkyl group and preferably methyl.

Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'-H]+[B $Ar_1$ $Ar_2$ $X_3$ $X_4$]—as described in EP-A-0277004 (page 6, line 30 to page 7, line 7).

The metallocene catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene. Preferably, the support is a silica having a surface area comprised between 200 and 900 $m^2/g$ and a pore volume comprised between 0.5 and 4 $cm^3/g$.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

Where the reaction is performed in a slurry using, for example, isobutane, a reaction temperature in the range 70° C. to 110° C. may be used. Where the reaction is performed in solution, by selection of a suitable solvent a reaction temperature in the range 150° C. to 300° C. may be used. The reaction may also be performed in the gas phase using a suitably supported catalyst.

In accordance with the invention, ethylene and the alpha-olefinic comonomer are supplied to the reactor containing the metallocene catalyst. Typical comonomers include hexene, butene, octene or methylpentene, preferably hexene. Hydrogen may be additionally supplied to the first reaction zone. Because the metallocene catalyst component of the present invention exhibits good comonomer response as well as good hydrogen response, substantially all of the comonomer is consumed in the first reactor in this embodiment. This produces high molecular weight polyethylene copolymer having a narrow molecular weight distribution.

The temperature of the reactor may be in the range of from 70° C. to 110° C., preferably from 70° C. to 100° C.

The MI2 of the linear low density polyethylene, made in accordance with the present invention typically falls in the range 0.05 to 2 g/10 min. The density of the linear low density resin is typically in the range 0.920 to 0.940 $g/cm^3$, and the molecular weight distribution in the range 2 to 4.5, preferably around 3.

Ziegler-Natta Catalysts

In the preferred process of the present invention, the homopolymerisation process with optional copolymerisation, using a Ziegler-Natta catalyst to produce a polyethylene having a monomodal molecular weight distribution, is carried out in the liquid phase in an inert diluent, the reactants comprising ethylene and hydrogen for homopolymerisation and for copolymerisation ethylene and an alpha-olefinic comonomer comprising from 3 to 8 carbon atoms. The comonomer may be selected from 1-butene, 1-pentene, 1-hexene, 4-methyl 1-pentene, 1-heptene and 1-octene. The inert diluent may comprise isobutane.

The polymerisation process is preferably carried out at a temperature of from 50 to 120° C., more preferably from 60 to 110° C., under an absolute pressure of 1 to 100 bar.

In the reactor, the ethylene monomer preferably comprises from 0.1 to 3% by weight based on the total weight of the ethylene monomer in the inert diluent and the hydrogen comprises from 0.1 to 2 mol % on the same basis. A particularly preferred composition in the reactor comprises 1% by weight ethylene and 0.8 mol % hydrogen. If a minor degree of copolymerisation is also carried out in the reactor, an alpha-olefinic comonomer as described above, typically hexene, is also introduced into the reactor. The proportion of comonomer introduced is limited to an amount whereby the density of the polyethylene produced in the reactor is at least 0.950 $g/cm^3$. The polymerisation product from the reactor preferably has a melt index MI2 of from 0.1 to 10 g/10 min, the melt index MI2 being measured determined using the procedures of ASTM D1238 using a load of 2.16 kg at a temperature of 190° C. The melt index MI2 is broadly inversely indicative of the molecular weight of the polymer. In other words, a low melt index is indicative of a high molecular weight for the polymer and vice versa. Typically, the polyethylene produced in the reactor has a density of about 0.960 $g/cm^3$.

The Ziegler-Natta catalyst preferably consists of a transition metal component (compound A) which is the reaction product of an organomagnesium compound with a titanium compound and an organoaluminium component (compound B).

As transition metal compounds suitable for the preparation of compound A, there are used tetravalent halogenated titanium compounds, preferably titanium compounds of the general formula $TiX_n(OR)_{4-n}$ in which n is 1 to 4, X stands for chlorine or bromine, and R for identical or different hydrocarbon radicals, especially straight-chain or branched alkyl groups having 1 to 18, preferably 1 to 10, carbon atoms.

Examples thereof are:

$TiCl_4$, $Ti(OC_2H_5)_2Cl_2$, $Ti(OC_2H_5)_3Cl$, $Ti(OC_3H_7)_2Cl_2$, $Ti(OC_3H_7)_3Cl$, $Ti(OiC_3H_7)_2Cl_2$, $Ti(OiC_3H_7)_3Cl$, $Ti(OiC_4H_9)_2Cl_2$, $Ti(OiC_4H_9)_3Cl$

In some cases, it may be advantageous to prepare the halogeno-ortho-titanic acid esters of the above formula in situ by reacting the respective ortho-titanic acid ester with $TiCl_4$ in a corresponding proportion.

This reaction is advantageously carried out at temperatures of from 0 to 200° C., the upper temperature limit being determined by the decomposition temperature of the tetravalent halogenated titanium compound used; it is advantageously carried out at temperatures of from 60 to 120° C.

The reaction may be effected in inert diluents, for example aliphatic or cycloaliphatic hydrocarbons as are currently used for the low pressure process such as butane, pentane, hexane, heptane, cyclohexane, methyl-cyclohexane as well as aromatic hydrocarbons, such as benzene or toluene; hydrogenated Diesel oil fractions which have been carefully freed from oxygen, sulphur compounds and moisture are also useful.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

For preparing compound A, magnesium alcoholates, preferably those of the general formula $Mg(OR)_2$ are used, in which R stands for identical or different hydrocarbon radicals, preferably straight-chain or branched alkyl groups having 1 to 10 carbon atoms; magnesium alcoholates having alkyl groups from 1 to 4 carbon atoms are preferred. Examples thereof are $Mg(OCH_3)_2$, $Mg(OC_2H_5)_2$, $Mg(OC_3H_7)_2$, $Mg(Oic_3H_7)_2$, $Mg(OC_4H_9)_2$, $Mg(OiC_4H_9)_2$, $Mg(OCH_2-CH_2-C_6H_5)_2$.

The magnesium alcoholates can be prepared by known methods, for example by reacting magnesium with alcohols, especially monohydric aliphatic alcohols.

Magnesium alcoholates of the general formula X—Mg—OR in which X stands for halogen, $(SO_4)_{1/2}$ carboxylate, especially acetate of OH, and R has the above composition, may also be used.

These compounds are, for example, obtained by reacting alcoholic solutions of the corresponding anhydrous acids with magnesium.

The titanium contents of compound A may be within the range of from 0.05 to 10 mg.-atom, per gram of compound A. It can be controlled by the reaction time, the reaction temperature and the concentration of the tetravalent halogenated titanium compound used.

The concentration of the titanium component fixed on the magnesium compound is advantageously in the range of from 0.005 to 1.5 mmol, preferably from 0.03 to 0.8 mmol, per liter of dispersing agent or reactor volume. Generally, even higher concentrations are possible.

The organo-aluminium compounds used may be reaction products of aluminium-trialkyl or aluminium-dialkyl hydrides with hydrocarbon radicals having 1 to 16 carbon atoms, preferably $Al(iBu)_3$ or $Al(iBu)_2H$ and diolefins containing 4 to 20 carbon atoms, preferably isoprene; for example aluminium isoprenyl.

Furthermore, suitable as compound B are chlorinated organo-aluminium compounds, for example dialkyl-aluminium monochlorides of the formula $R_2AlCl$ or alkyl-aluminium sesquichlorides of the formula $R_3Al_2Cl_3$, in which formulae R stands for identical or different hydrocarbon radicals, preferably alkyl groups having 1 to 16 carbon atoms, preferably 2 to 12 carbon atoms, for example $(C_2H_5)_2AlCl$, $(iC_4H_9)_2AlCl$, or $(C_2H_5)_3Al_2Cl_3$.

It is advantageous to use, as compound B, aluminium-trialkyls of the formula $AlR_3$ or aluminium-dialkyl hydrides of the formula $AlR_2H$, in which formulae R stands for identical or different hydrocarbons, preferably alkyl groups having 1 to 16, preferably 2 to 6, carbon atoms, for example $Al(C_2H_5)_3$, $Al(C_2H_5)_2H$, $Al(C_3H_7)_3$, $Al(C_3H_7)_2H$, $Al(iC_4H_9)_3$, or $Al(iC_4H_9)_2H$.

The organoaluminium may be used in a concentration of from 0.5 to 10 mmol per liter of reactor volume.

Optionally, a cocatalyst such as a triethylaluminium (TEAL) is employed in the reactor, for example in an amount of around 250 ppm by weight based on the weight of the inert diluent.

According to the present invention, each polyethylene is produced individually in a reactor, preferably a loop reactor and physically blended with one another for example by extrusion or melt blending. In this way, the low molecular weight and high molecular weight parts of the polyethylene resin can be produced in separate reactors.

The invention will now be described in further detail, by way of examples.

LIST OF FIGURES

FIG. 7 represents the Young's modulus expressed in Mpa as a function of the density of the blend expressed in g/cm$^3$.

EXAMPLES

Figure 1:
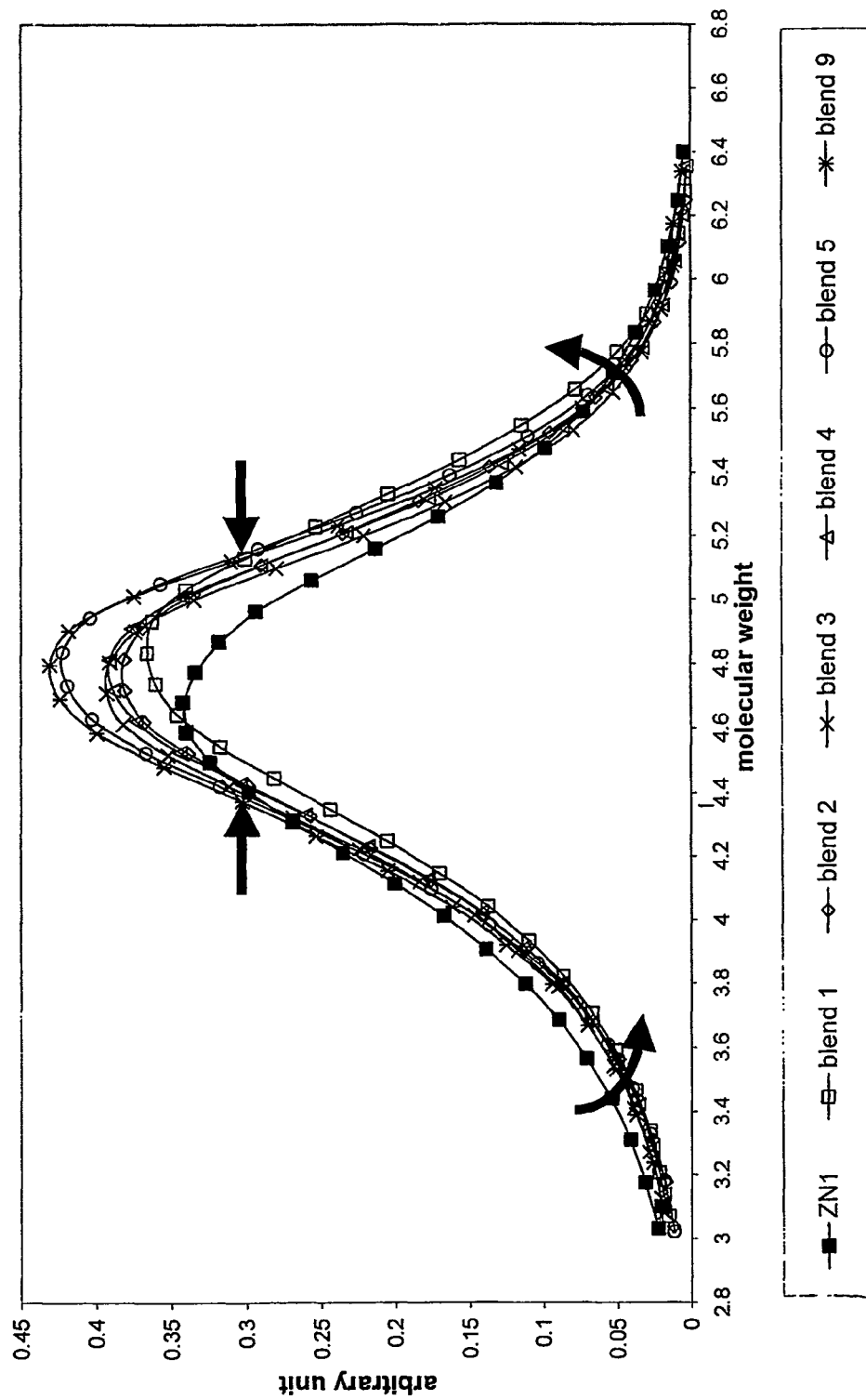
FIG. 1 represents the molecular weight distributions of the Ziegler-Natta high density polyethylene (HDPE) resin ZN1 and of the blends B1 to B5 and B9 of a metallocene-produced linear low density polyethylene (mLLDPE) with the Ziegler-Natta HDPE ZN1.

The linear low density, metallocene-produced resins used in the blends are described in Table 1.

TABLE 1

| Resin | MLL1 | MLL2 | MLL3 | MLL4 | MLL5 | MLL6 |
|---|---|---|---|---|---|---|
| Catalyst | THI[a] | THI | THI | THI | THI | n-butyl[b] |
| Ml2 g/10 min | 0.9 | 0.3 | 0.8 | 0.9 | 0.5 | 1.6 |
| Desity g/cm$^3$ | 0.934 | 0.932 | 0.933 | 0.926 | 0.927 | 0.932 |

[a]THI is ethylene bis(4,5,6,7-tetrahydro-1-indenyl) zirconium dichloride.
[b]n-butyl is bis(n-butyl-cyclopentadienyl) zirconium dichloride.

The high density polyethylene resins are described in Table 2.

TABLE 2

| resin | ZN1 | ZN2 | MH1 |
|---|---|---|---|
| catalyst | Ziegler-Natta | Ziegler-Natta | THI |
| Ml2 g/10 min | 2.9 | 1.03 | 2.4 |
| Density g/cm$^3$ | 0.96 | 0.96 | 0.96 |

Several blends have been prepared from these starting resins. The resins used in the blends and proportions of each of these resins are summarised in Table 3.

TABLE 3

|    | ZN1 | ZN2 | MH1 | MLL1 | MLL2 | MLL3 | MLL4 | MLL5 | MLL6 | Blend type | D[a] Ml2[b] |
|---|---|---|---|---|---|---|---|---|---|---|---|
| B1 | 53.8% |  |  |  | 46.2% |  |  |  |  | ZN THI | 0.946 1.1 |
| B2 | 51.9% |  |  |  |  | 48.1% |  |  |  | ZN THI | 0.946 1.7 |
| B3 | 60.2% |  |  |  |  |  | 39.8% |  |  | ZN THI | 0.945 1.9 |
| B4 | 59.9% |  |  |  |  |  | 40.1% |  |  | ZN THI | 0.945 1.4 |
| B5 | 50% |  |  |  |  |  |  | 50% |  | ZN THI | 0.942 1.3 |
| B6 |  | 61.5% |  |  |  |  |  | 38.5% |  | ZN THI | 0.945 0.8 |
| B7 | 49.3% |  |  |  |  |  |  |  | 50.7% | ZN n-butyl | 0.945 1.3 |
| B8 |  | 61.5% |  | 38.5% |  |  |  |  |  | ZN THI | 0.948 0.9 |
| B9 | 59.3% |  |  | 40.7% |  |  |  |  |  | ZN THI | 0.95 1.7 |
| B10 |  |  | 64% | 36% |  |  |  |  |  | THI THI | 0.95 1.7 |

[a]the density is expressed in g/cm$^3$.
[b]the Ml2 is expressed in g/10 min.

Blends B1 to B7 were pelletised twice on a Thoret extruder (single screw) under the following extrusion conditions:
200° C. (feeding zone), 220° C. (central zone) and 220° C. (die)
screw speed between 50 and 70 rpm
3 holes die
fluff under nitrogen stream
cutting device speed of about 20 mm/s
quantity: 7 kg.

Blends B8 to B9 were pelletised on a ZSK-58 extruder (twin screw device) under the following extrusion conditions:
220° C. along the whole barrel
screw speed of about 250 rpm
15 holes die
fluff under nitrogen stream
cutting device speed around 20 m/min
quantity-100 kg.

Blend B4 was re-pelletised on a Leonard extruder (single crew device) under the following conditions:
190° C. (feeding zone), 200° C. (central zone), and 200° C. (die)
screw speed 80 rpm
6 holes die
fluff under nitrogen stream
cutting device speed around 6 m/min
quantity—100 kg.

The blends resulting from either mixing system have identical characteristics.

Iso tensile bars were injection-moulded on a 125t Engel injection machine under the conditions summarised in Table 4.

TABLE 4

| Melt temperature | 220° C. |
|---|---|
| Mould temperature | 40° C. |
| Injection speed | 25 mm/s |
| Holding pressure | 100 Mpa |
| Holding time | 20 s |

TABLE 4-continued

| Cooling time | 35 s |
|---|---|
| Tensile bars number | 30 |

Disks of 180 mm diameter and 3 mm thickness were also injection-moulded on a 125t Engel injection machine under the conditions summarised in Table 5.

TABLE 5

| | |
|---|---|
| Melt temperature | 220° C. |
| Mould temperature | 25° C. |
| Injection speed | 20 mm/s |
| Holding pressure | 70 Mpa |
| Holding time | 20 s |
| Cooling time | 35 s |
| Tensile bars number | 10 |

Bottles having a capacity of 700 ml and a wall thickness of 1 mm were blow-moulded on a VK1-4 machine under the following conditions:
    flow rate of 15 kg/h
    die tool: converging
    temperature of 160° C. for blends of two metallocene-produced polyethylenes and of 170° C. for blends of a metallocene-produced linear low density polyethylene with a Ziegler-Natta HDPE.

Figure 2:
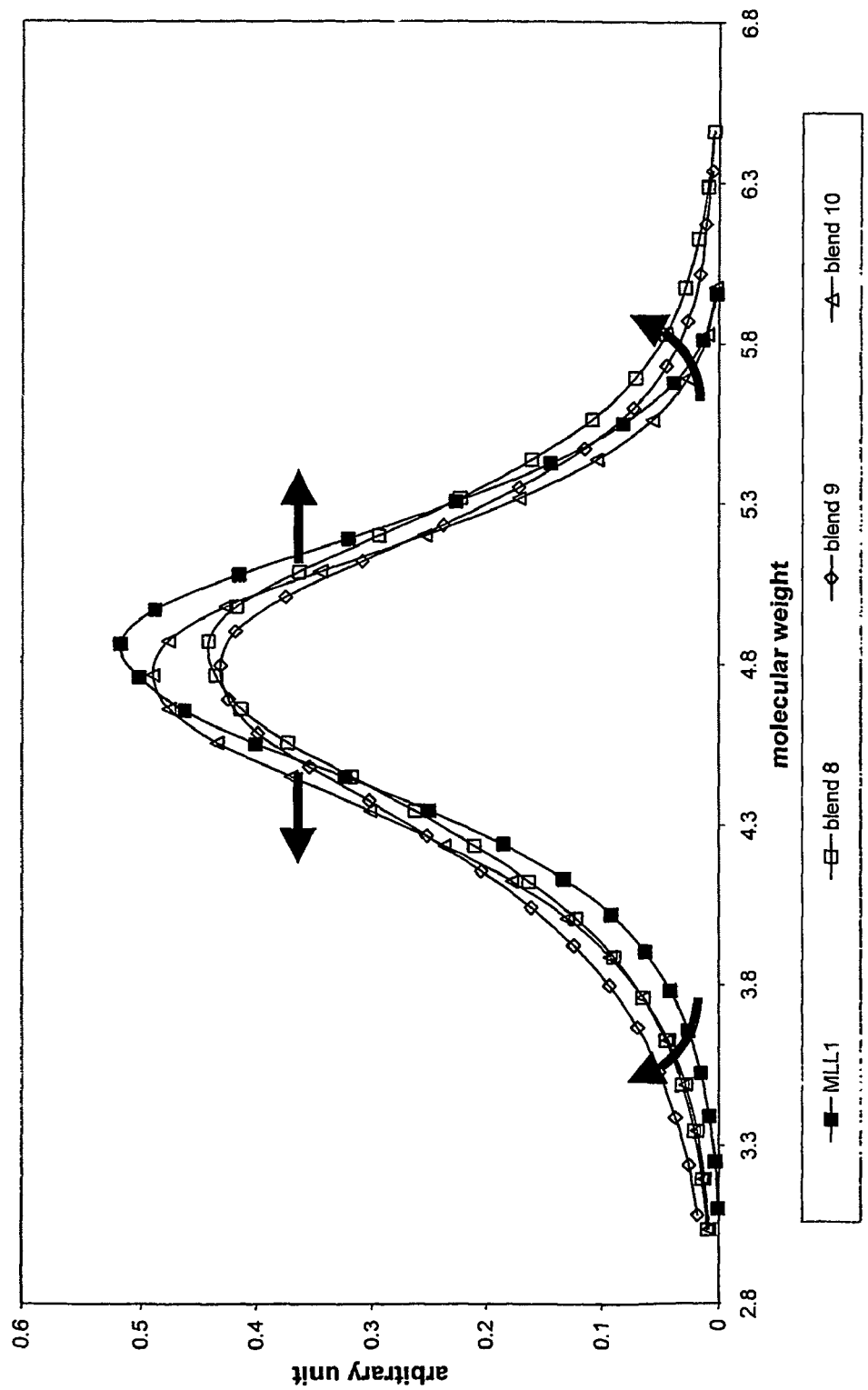
FIG. 2 represents the molecular weight distributions of the metallocene-produced high density polyethylene resin M1 and of the blends B8 to B10 of a metallocene-produced linear low density polyethylene (mLLDPE) with the metallocene HDPE MH1.

The molecular weight distributions of the blends B1 to B5 and B9 and of the HDPE ZN1 are represented in FIG. 1. It can be observed that the molecular weight distributions of the blends are narrower than that of the Ziegler-Natta HDPE alone. The molecular weight distribution of the blends B8 to B10 and of the metallocene-produced HDPE are represented in FIG. 2. The molecular weight distributions of the blends B8 and B9 are broader than that of the metallocene-produced HDPE and they contain more long chains and more short chains. The molecular weight distribution of blend B10 that is prepared by blending two metallocene-produced polyethylenes has the same width as the metallocene-produced HDPE but it is shifted to the lower molecular weight.

Figure 3:
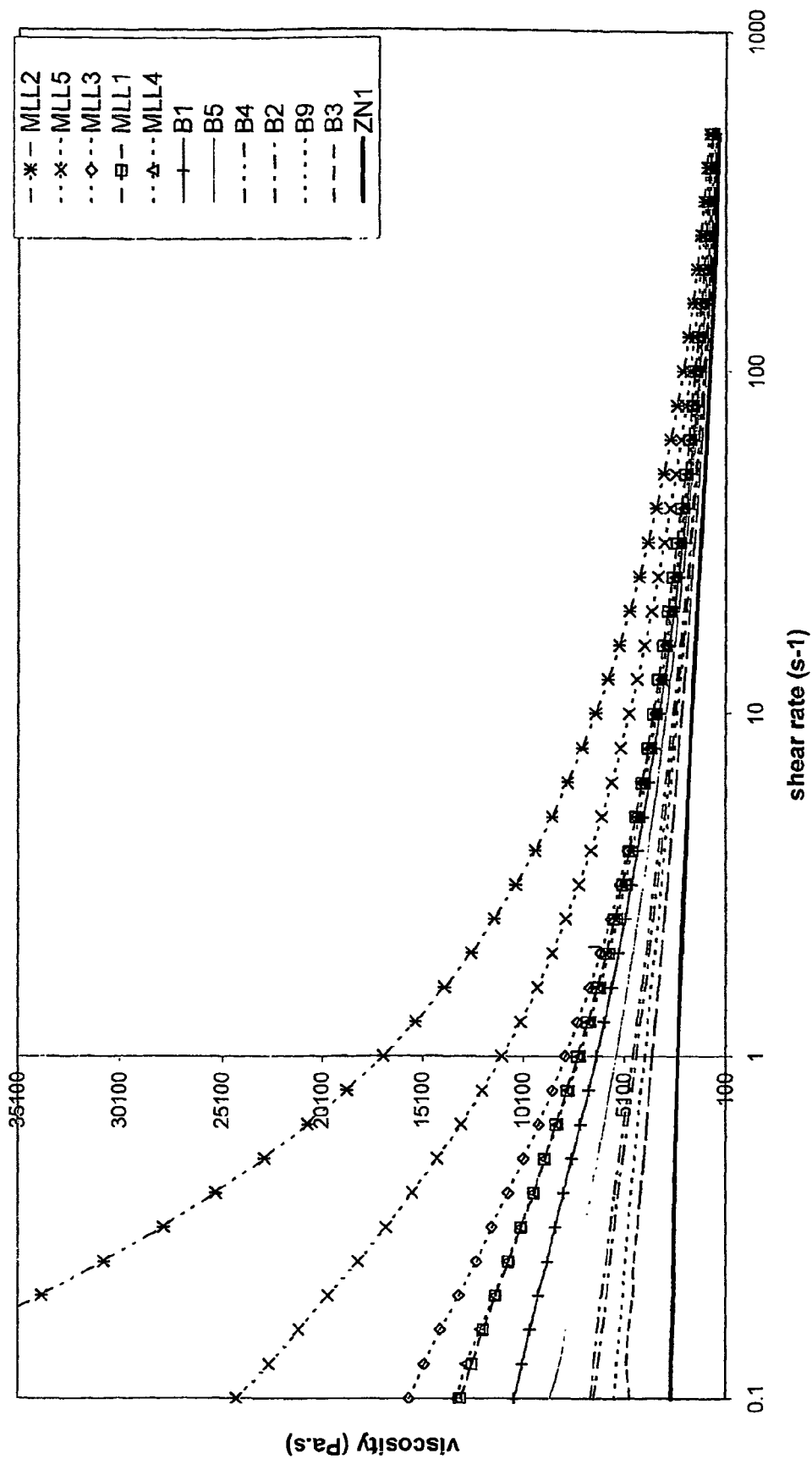
FIG. 3 represents the viscosity expressed in Pa·s as a function of shear rate expressed in s-1 for the Ziegler-Natta HDPE resin ZN1 and for the blends B1 to B5 and B9 of a mLLDPE with the Ziegler-Natta HDPE ZN1.

A dynamic rheology analysis has been carried out on all blends in relation with processability. The shear-thinning behaviour of the resins is displayed in FIG. 3. FIG. 3 is a plot of the viscosity as a function of shear rate for the resin ZN1 and the blends B1 to B5 and B9 of a mLLDPE with a Ziegler-Natta HDPE. For comparison purposes, the viscosity of pure metallocene-prepared linear low density polyethylenes has also been plotted on the same graph. It is observed that the shear-thinning phenomenon is strongly dependent upon the catalytic system used to prepare the polyethylene resin because of its impact upon the intrinsic molecular structure of the polymer. The shear-thinning (S-T) of various pure resins can be ranked as follows:

$$S\text{-}T_{THI} > S\text{-}T_{Z\text{-}N} > S\text{-}T_{n\text{-}butyl}$$

The shear-thinning (S-T) of various blends can be ranked as follows:

$$S\text{-}T_{THI/THI} > S\text{-}T_{Z\text{-}N/THI} > S\text{-}T_{ZN/n\text{-}butyl}$$

Figure 4:
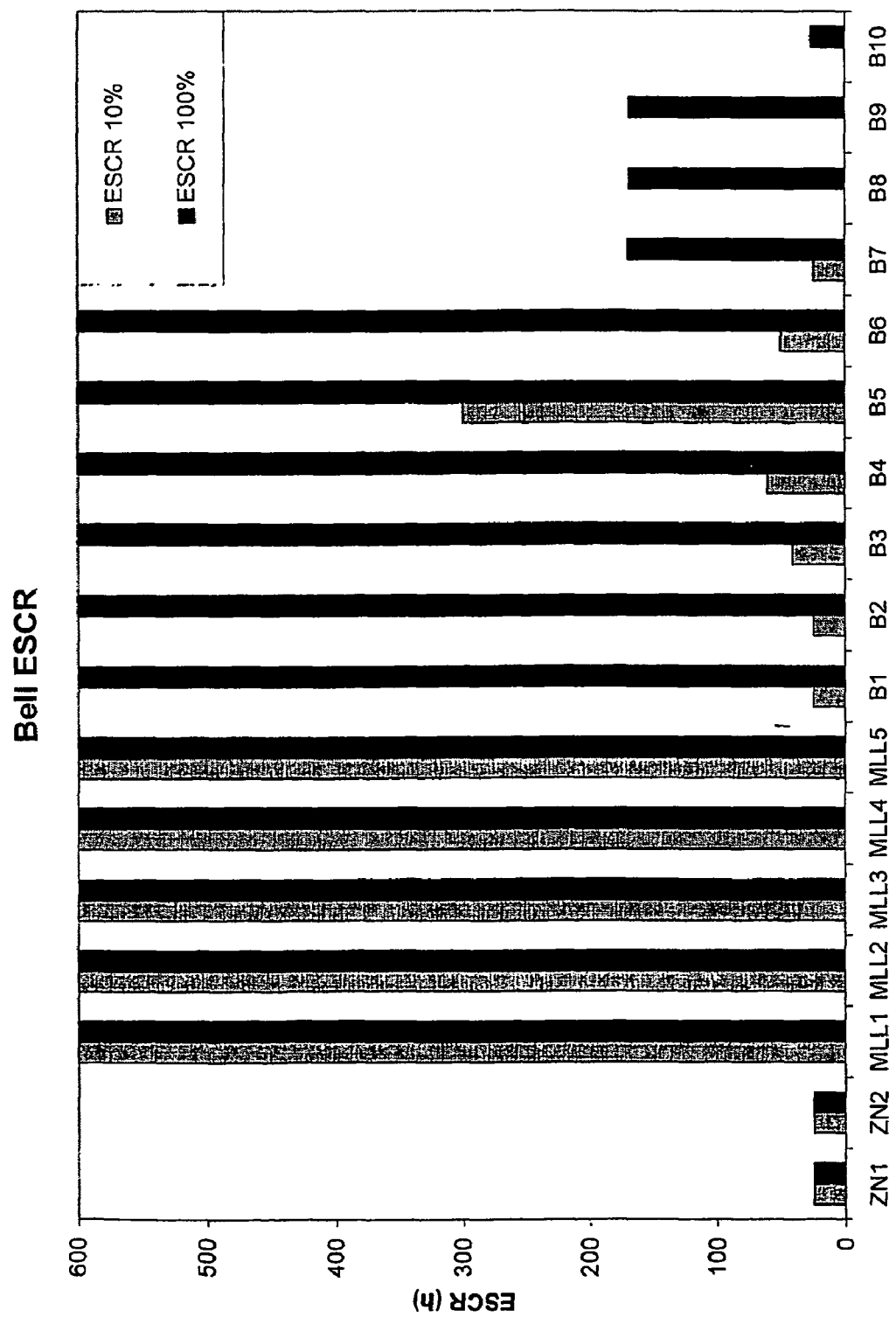
FIG. 4 represents the Bell ESCR expressed in hours using 10%- and 100%-concentrated Antarox as deteriorating agent for the HDPE resins ZN1, ZN2 and for the blends B1 to B10 of a mLLDPE with a HDPE.
Figure 6:
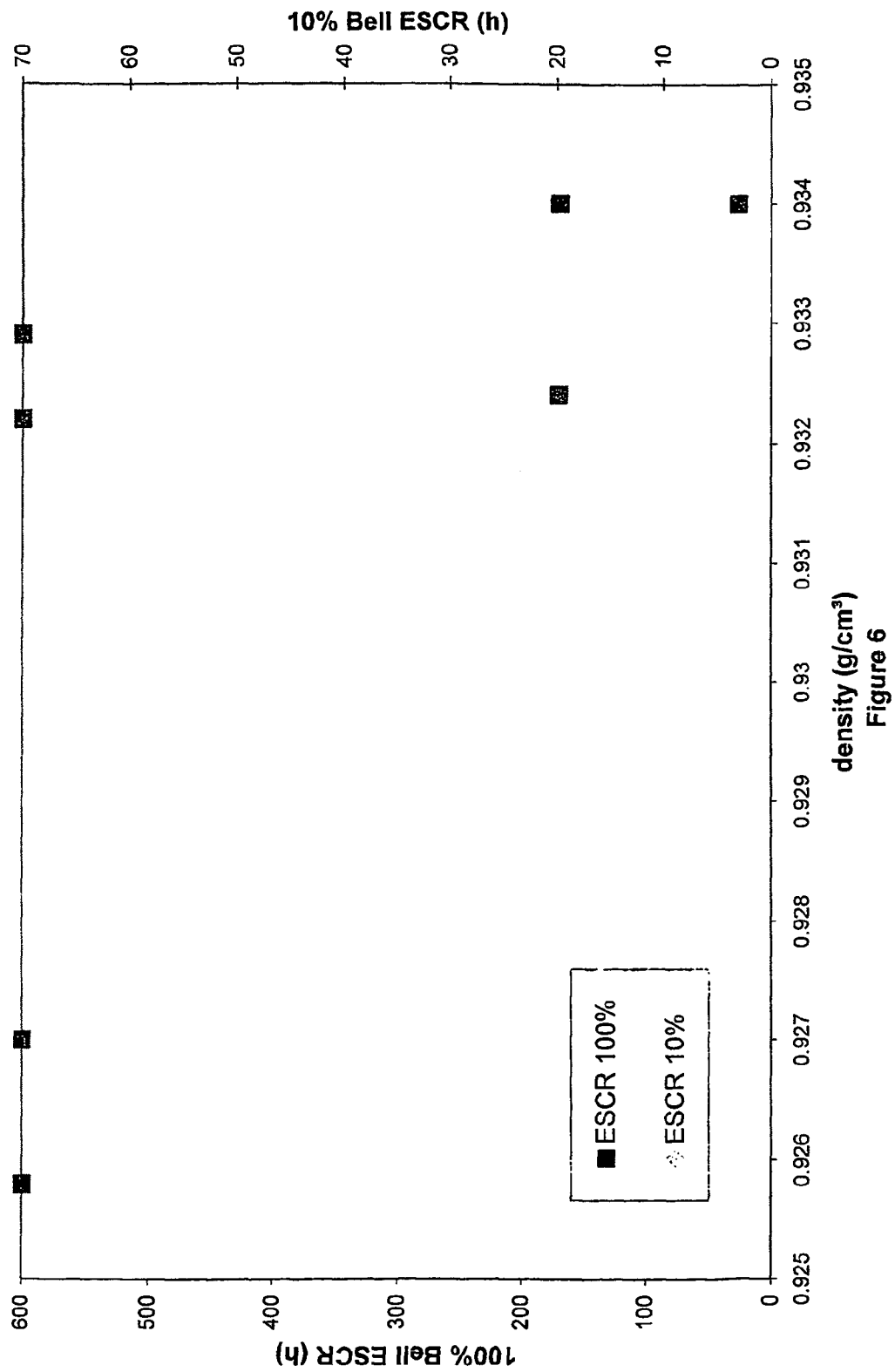
FIG. 6 represents the Bell ESCR expressed in hours using 100% concentrated Antarox as deteriorating agent as a function of the density of the mLLDPE expressed in $g/cm^3$.

These blends have been tested for stress crack resistance. In order to evaluate the gain in stress crack resistance of the blends prepared according to the invention, Bell Environmental Stress Crack Resistance test (Bell ESCR) has been performed following the method of standard test ASTM D 1690 and using 10%- and 100%-concentrated solutions of Antarox as deteriorating agent at a testing temperature of 50° C. It must be noted that for polarity reasons, the 10%-concentrated solution of Antarox is more detrimental to stress crack resistance than the 100%-concentrated solution of Antarox. The results are displayed in FIG. 4 representing the ESCR in hours for the two concentrations of deteriorating agent and for various blends and pure resins. The figure shows a remarkable improvement in ESCR for most blends of the invention. The key parameters for this improvement are the density of the low density polyethylene resin and the final density of the blend. The critical maximum value for the low density polyethylene component is between 0.932 and 0.934 g/cm$^3$ as shown on FIG. 6. For densities of the low density component larger than that critical value, little or no improvement is observed. It is further observed that the ESCR improves if the content of low density polyethylene incorporated in the blend increases. This effect can be seen for example when comparing blends B4 and B5: both blends are prepared with the same components ZN1 and mLL5, B4 and B5 containing respectively 40.1 and 50 wt % of the low density component.

Compression tests have also been carried out at 40° C. on the bottles prepared by blow moulding that have been described higher. The solution used in stress crack evaluation is a 5% Huperol wetting solution. A 10 kg-overload compression force is applied on the bottle. The bottle height is measured during testing and the crack apparition is recorded. The blends according to the present invention all have substantially improved stress crack resistance and the stress crack resistance increases with decreasing density of the mLLDPE and increases with increasing amounts of said mLLDPE. The density of the mLLDPE must be smaller than 0.935 g/cm$^3$ in order to produce a significant improvement of the stress crack resistance.

The blends of the present invention have been tested for warping. The evaluation has been carried out on the discs prepared by injection-moulding that were described in a previous paragraph. Three different buckling modes can be observed with this mould geometry:
    saddle-like warping
    bowl-like warping
    waving at circumference with three cycles.

In the present case, the discs were deformed in the saddle-like mode. The contour evolution is measured with respect to a planar reference configuration and a waving with two cycles is observed. The test was carried out on blends B6 and B7 and on the mLLDPE MLL1. The deformation of the blends according to the present invention is substantially decreased.

Figure 5:
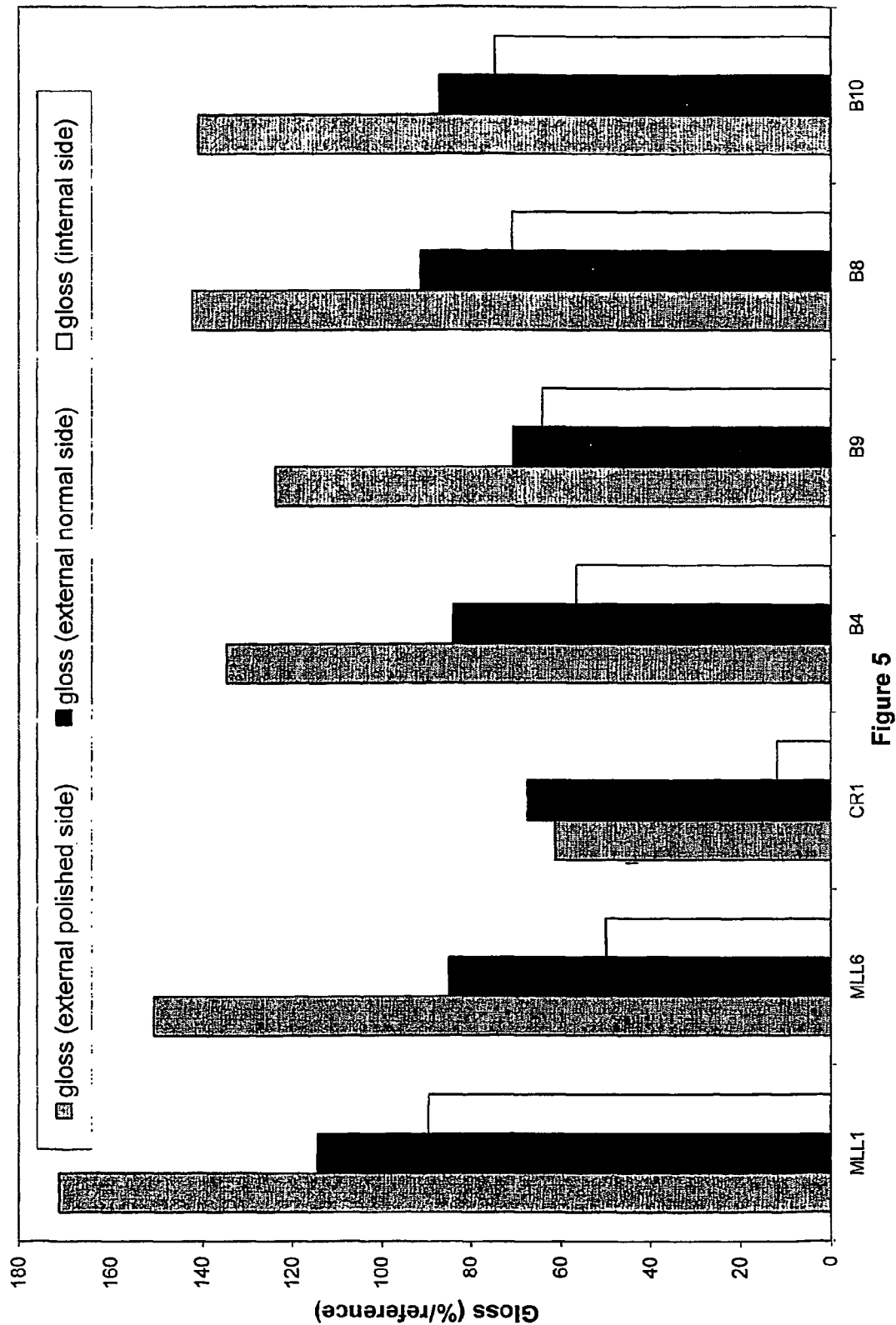
FIG. 5 represents the gloss measured on blow moulded bottles of 700 ml produced respectively with the metallocene-produced resins MLL1 and MLL6, the chromium resin CR1, a metallocene-produced polyethylene, and the blends B4, B8, B9 and B10.

Metallocene-produced resins are mainly used to prepare packaging with dramatically improved gloss and exceptional ESCR. Gloss tests have been carried out on a number of the bottles produced by blow-moulding as described in a previous paragraph using various pure resins (LLDPE's prepared with the metallocene catalysts THI and with n-butyl, and with Ziegler-Natta and chromium catalysts) and using blends B4 and B8 to BIO prepared according to the present invention. The measurements were carried out following the method of standard test ASTM D 2457-90. In addition, the mould was divided into two halves each having different mould structure: one half of the mould had untreated side-walls, the other half of the mould had polished side-walls. Gloss measurements were also carried out in the internal side of each bottle in order to provide an information that is independent of the mould texture. The blends all show excellent gloss, especially on the external side of the bottle: their ability to reproduce the mould texture is very high. The gloss results are displayed in FIG. 5 representing the gloss measurements for all the resins described here-above on the untreated side of the mould, on the polished side of the mould and on the internal side of the bottles.

Iso tensile tests have been performed on the blends B1 to B7 and on mLL1 and ZN1, following the method of standard test ISO 527. The results are displayed on FIG. 7 that represents the Young's modulus as a function of density for these resins. A linear correlation is observed between the stiffness of the resins and their density. As the density of the blend is expressed as, $$D_{blend} = \Sigma(\% n).D_n$$

It follows that the rigidity E of the blend can be written as $$E_{blend} = \text{wt \% } HDPE \times E_{HDPE} + \text{wt \% } mLLDPE \times E_{mLLDPE}.$$

For the impact resistance, the notched Izod impact strength has been measured following the method of standard test ISO 180 at temperatures of −20 and −40° C. All the blends according to the present invention had an impact resistance that was adequate for preparing the range of injected or blow-moulded articles of this invention.

The blends of the present invention can be used in blow-moulding applications such as for example milk bottles, fuel tanks or cosmetic packaging. They can also be used in injection-moulding applications such as for example fuel tanks, bottle caps for soft drinks or cosmetic and pharmaceutical packaging. Table 6 summarises the target applications and the properties of the resin required for each of these target applications.

TABLE 6

| Target | Requirements |
| --- | --- |
| Injected fuel tanks | D = 0.947 g/cm³<br>0.5 < MI2 < 2 g/10 min<br>Injection moulding<br>ESCR<br>Warping, shrinkage<br>Fire resistance |
| Injected bottle caps | D = 0.952 g/cm³<br>0.5 < MI2 < 3 g/10 min<br>Injection moulding<br>ESCR<br>Warping, shrinkage<br>Organoleptic properties<br>Opening ease |
| Milk bottles | D = 0.952 g/cm³<br>1.0 < MI2 < 2.5 g/10 min<br>Blow moulding<br>Melt strength<br>Organoleptic properties |
| Cosmetic packaging | D = 0.950 g/cm³<br>0.8 < MI2 < 2.5 g/10 min<br>Blow moulding<br>Melt strength<br>ESCR<br>Gloss/Haze |

Four resins have been preferably selected to prepare the blends to be used for these various applications:

two HDPE resins, ZN2 and a new resin (MH2) prepared with ethylene bis(4,5,6,7-tetrahydro-1-indenyl)zirconium dichloride and having a density of 0.960 g/cm³ and a MI2 of 2.0 g/10 min, two mLLDPE resins, MLL1 and a new resin (MLL7) prepared with ethylene bis(4,5,6,7-tetrahydro-1-indenyl)zirconium dichloride and having a density of 0.927 g/cm³ and a MI2 of 0.3 g/10 min.

Blending two by two one resin from each group in various amounts allows the manufacture of products with the desired combination of properties. Table 7 displays some of the possible combinations and gives the optimal percentage in wt % of each component in the blend.

TABLE 7

| HDPE | MLLDPE | Injected fuel tank | Injected bottle caps | Milk bottles | Cosmetic packaging |
| --- | --- | --- | --- | --- | --- |
| ZN2 | MLL1 | 50% ZN2<br>50% MLL1 | — | — | 60% ZN2<br>40% MLL1 |
| ZN2 | MLL7 | 60% ZN2<br>40% MLL7 | — | — | — |
| MH2 | MLL1 | — | 70% MH2<br>30% MLL1 | 70% MH2<br>30% MLL1 | — |
| MH2 | MLL7 | 60% MH2<br>40% MLL7 | 75% MH2<br>25% MLL7 | 75% MH2<br>25% MLL7 | 70% MH2<br>30% MLL7 |

Because of the excellent performances of the blends prepared according to the present invention, it is possible to cover a large field of applications with a small set of basis resins by varying the blend compositions, both in the choice of the resins and the amount of each selected resin. The desired density and MI2 can be obtained for the blends, using the predictive equations:

$$D_{blend} = \Sigma(\% n).D_n$$

for the density wherein $D_n$ represents the density of component n of the blend, and (% n) its percentage in the blend, and $$MI2_{blend} = \Pi MI2_n^{(\% n)}$$

for the MI2, wherein $MI2_n$ represents the MI2 of component n of the blend and (% n) its percentage in the blend.

The invention claimed is:

1. A process for the preparation of a polyethylene resin composition having a narrow molecular weight distribution comprising:
    a. providing a first metallocene-produced linear low density polyethylene (mLLDPE) resin having a density within the range of 0.92 to 0.94 g/cm³ and a melt index MI2 within the range of 0.05 to 2 g/10 min.;
    b. providing a second high density polyethylene (HDPE) resin prepared either with a Ziegler-Natta catalyst or with a metallocene catalyst and having a density within the range of 0.95 to 0.97 g/cm³ and a melt index MI2 within the range of 0.1 to 10 g/10 min.; and
    c. blending together said first and second polyethylenes to form a polyethylene resin composition having a narrow molecular weight distribution, a density within the range of 0.93 to 0.955 g/cm³ and a melt index MI2 within the range of 0.5 to 8 g/10 min.

2. The process according to claim 1 wherein said blended polyethylene resin composition has a density within the range of 0.94 to 0.955.

3. The process according to claim 2 wherein said blended polyethylene resin composition has a melt index MI2 within the range of 0.5 to 3 g/10 min.

4. The process according to claim 1 wherein the first metallocene-produced linear low density polyethylene has a density of no more than 0.935 g/cm³.

5. The process according to claim 1 wherein the polyethylene resin composition is a physical blend and comprises at least 15 wt. % of the first metallocene-produced linear low density polyethylene.

6. The process according to claim 1 wherein the polyethylene resin composition is a physical blend and comprises from 20 to 80 wt. % of the first metallocene-produced linear low density polyethylene and from 80 to 20 wt. % of the second high density HDPE resin.

7. The process according to claim 1 wherein said blended polyethylene resin composition comprises from 30 to 50 wt. % of said linear low density polyethylene resin and from 50 to 70 wt. % of said second high density polyethylene.

8. The process according to claim 7 wherein said polyethylene resin composition has a density within the range of 0.94 to 0.955 g/cm$^3$.

9. The process according to claim 8 wherein said polyethylene resin composition has a melt index MI2 within the range of 0.5 to 3 g/10 min.

10. The process according to claim 1 wherein said linear low density polyethylene resin and said high density polyethylene resin are produced in separate reactors, recovered from said separate reactors, and then physically blended together to produce said polyethylene resin composition.

11. The process according to claim 10 wherein said high density polyethylene resin is prepared with a Ziegler-Natta catalyst and the blend of said first and second polyethylenes has a narrower molecular weight distribution than the molecular weight distribution of said second high density polyethylene.

12. A process for the preparation of a polyethylene composition having a narrow molecular weight distribution which comprises:
   a. contacting an ethylene monomer and a co-monomer comprising an alpha olefin having from 3 to 10 carbon atoms with a first catalyst system in a first reactor under first polymerization conditions to produce a first polyethylene resin having a first molecular weight, a first melt index MI2 of no more than 2 g/10 min. and a first density of no more than 0.94 g/cm$^3$, said first catalyst system comprising (a) a metallocene catalyst comprising a bis tetrahydroindenyl compound or a bis(n-butyl-cyclopentadienyl) compound; and (b) a catalyst which activates the catalyst component;
   b. providing a second polyethylene resin having a second density greater than said first density and a second melt index MI2 greater than said first melt index MI2 of said first polyethylene resin and prepared with a Ziegler-Natta or a metallocene catalyst; and
   c. blending together the first and second polyethylene resins to form a polyethylene composition having a narrow molecular weight distribution, a melt index MI2 within the range of 0.5 to 3 g/10 min. and a density within the range of 0.94 to 0.955 g/cm$^3$.

13. A process according to claim 11 wherein the metallocene catalyst used to prepare the first polyethylene resin is ethylene bis(4,5,6,7-tetrahydro-1-indenyl)zirconium dichloride.

14. A polyethylene resin composition having a narrow molecular weight distribution comprising:
   a. a first metallocene-produced linear low density polyethylene (mLLDPE) resin having a density within the range of 0.92 to 0.94 g/cm$^3$ and a melt index MI2 within the range of 0.05 to 2 g/10 min.;
   b. a second high density polyethylene (HDPE) resin prepared either with a Ziegler-Natta catalyst or with a metallocene catalyst and having a density within the range of 0.95 to 0.97 g/cm$^3$ and a melt index MI2 within the range of 0.1 to 10 g/10 min.; and
   c. said first and second polyethylene resins being blended together to form a polyethylene resin composition having a narrow molecular weight distribution, a density within the range of 0.93 to 0.955 g/cm$^3$ and a melt index MI2 within the range of 0.5 to 8 g/10 min.

15. A container comprising a wall structure formed by a polyethylene composition according to claim 14.

16. The container of claim 15 wherein said container is a fuel tank formed by injection molding.

17. The container of claim 15 wherein said container comprises a milk bottle formed by blow molding.

18. The system of claim 15 wherein said container is a container suitable for the packaging of cosmetic or pharmaceutical materials.

* * * * *